United States Patent [19]

Weissenfels et al.

[11] 4,426,462
[45] Jan. 17, 1984

[54] METHOD FOR THE PREPARATION OF HIGHLY ABSORBENT PHENOLIC RESIN FOAMS

[75] Inventors: Franz Weissenfels, Sieburg; Walter Engels, Siegberg, both of Fed. Rep. of Germany

[73] Assignee: Dynamit Nobel AG, Cologne, Fed. Rep. of Germany

[21] Appl. No.: 402,453

[22] Filed: Jul. 27, 1982

[51] Int. Cl.$^3$ ................................................ C08J 9/14
[52] U.S. Cl. .................................. 521/116; 521/121; 521/125; 521/181
[58] Field of Search ................. 521/116, 121, 181, 125

[56] References Cited

U.S. PATENT DOCUMENTS

| | | | |
|---|---|---|---|
| 3,694,387 | 9/1972 | Junger et al. | 521/181 |
| 3,779,959 | 12/1973 | Pinten et al. | 521/181 |
| 4,216,295 | 8/1980 | Dahms | 521/181 |
| 4,334,971 | 6/1982 | Mahnke et al. | 521/181 |

Primary Examiner—Morton Foelak
Attorney, Agent, or Firm—Felfe & Lynch

[57] ABSTRACT

Improvement in the preparation of open-pored phenolic resin foams by the foaming of intimate mixtures of water-containing phenolic resol resins in the viscosity range of from 1000 to 20,000 cP, low-boiling organic liquids in which the phenolic resol resins are not soluble as blowing agents and acid-containing hardeners, the improvement comprising adding to the foamable phenolic resol resin before or during the preparation of the foamable mixture, 1.0 to 6.0 weight-percent of ethoxylated castor oil and 0.5 to 5 weight-percent of an alkyl sulfate salt of the general formula $$C_xH_{2x+1}-O-SO_3-Me^+$$

wherein x an integer from 8 to 18 and Me is an alkali metal or a triethanolamine cation.

8 Claims, No Drawings

METHOD FOR THE PREPARATION OF HIGHLY ABSORBENT PHENOLIC RESIN FOAMS

This invention relates to a method for the preparation of largely open-celled phenol resin foams having a controllable absorption and retention capacity for liquids—preferably water—and gases.

The preparation of foam substances from liquid phenolic resins of the resol type is known. In general, the procedure is to mix the liquid phenolic resol resin with a surface-active substance, a blowing agent and a hardener. The foamable mixture thus prepared is placed in a mold which does not close air-tight. The foaming and curing are performed, depending on the kind of phenolic resol resin used, either at 40° to 60° C., or at room temperature without input of external heat. The foam material thus obtained can be further processed after cooling. The surface-active substances which are added to the phenolic resol resins to control foam cell size and achieve a uniform and mainly closed-cell structure are usually described in the literature as non-ionogenic emulsifiers.

Particularly the addition, described in German Patent No. 1,236,183 and elsewhere, of 0.5 to 5% of a castor oil rendered water-soluble by ethoxylation leads to a very uniform, fine-pored and mostly closed-cell structure.

The blowing agents involve essentially two groups of substances. The one group contains products which react to produce gases with the substances (e.g., acid or water) contained in the foamable mixture. The gas that forms in minute bubbles expands the phenolic resol resin to a foam. The hardener, present in an excess, causes the hardening. The other group of blowing agents includes low-boiling organic compounds, such as for example N-pentane, chlorofluoromethanes etc. These substances are vaporized by the exothermic heat developed by the condensation of the resin, or by the additionally input heat, and thus cause a foaming up of the liquid phenolic resol resin. Simultaneously with the foaming process, the hardener present in the mixture brings about an increasing solidification and finally a hardening of the foam. It has been possible to vary the density of the foams by controlling the amount of the blowing agent that is used.

The density of the phenolic resin foam substances produced in this manner is mostly in the range from 20 to 100 kg/m$^3$; the foams are of a uniform, fine-pored structure and they are mostly closed-cell foams; according to DIN 7726, they are designated as brittle-hard. Absorption of moisture takes place but very slowly. Test specimens measuring 50×50×50 mm, when kept under water, have a moisture absorption in one hour between 0 and 0.5% by volume. Permeability of phenolic resin foam plates to a column of water standing on them is virtually nil. Their diffusibility is slight, and the diffusion resistance factor is dependent on the density of the foam and ranges from 10 to 300 for densities of 20 to 100 kg/m$^3$.

After their manufacture, the described phenolic resin foam materials contain traces of free hardener acids. In general these acid residues do not interfere with technical applications of the foams. If for special applications the acid residues must be removed, this can be accomplished, where volatile acids are involved, by heating the foam materials and/or by the action of gaseous alkalies, such as ammonia, for example.

These known phenolic resin foams are used preferentially in the sense of DIN 18164 as a technical insulating material for thermal insulation purposes. On the basis of their mostly closed-cell structure, however, they do not have any fast absorption capacity for liquids, which is required in many cases, especially for their use as foam for cut flower arrangement or as a substrate material for the soil-less cultivation of plants. There has therefore been a need to find a method or a formula for the preparation of such phenolic resin foam materials which, while retaining the above-described qualities characteristic of phenolic resin foams, would have a mostly open-pored structure, would have a high ability to absorb water rapidly, and whose retentivity for an amount of absorbed liquid would be largely controllable within wide limits (for foam thicknesses up to 10 cm laid horizontally). Combined with this, they would also have to have a high permeability for gaseous substances. These properties were to be provided preferably in such phenolic resin foams having densities in the range from 7 to 150 kg/m$^3$, preferably from 7 to 50, where the foam is applied for flower arrangements or as substrate for plants.

To solve this problem, a method has now been found for the preparation of phenolic resin foam materials by the foaming of intimate mixtures of water-containing phneolic resol resins in the viscosity range of 1,000 to 20,000 cP (at 20° C. according to Hoepler), and low-boiling organic liquids having no ability to dissolve the phenolic resol resins, and acid-containing hardeners, characterized in that, before or during the preparation of the foamable phenolic resol resin, 1.0 to 6.0 weight-percent of ethoxylated castor oil and 0.5 to 5 weight-percent of an alkyl sulfate salt of the general formula $C_xH_{2x+1}$—O—$SO_3$—$Me^{30}$ are added to it, in which formula x can assume values between 8 and 18, preferably 12 to 14, and Me can be an alkali metal or a triethanolamine cation.

It is known from U.S. Pat. No. 4,225,679 to add surface-active substances to phenolic resol resins before foaming. The combination of Texapon N25 and, polyoxyethylene sorbitan monolaurate named in this patent, however, brings the result that the cells obtained are entirely open-pored and the water that has penetrated is entirely retained, while the Texapon N25 named in the patent does result in a better water retention capacity in the foams; that means that the water retention capacity cannot be regulated by these two cell regulators. If the weight ratios named in this patent are changed, foams are easily obtained which have an irregular structure or which collapse entirely or partially even while the foaming is in progress.

The method of preparing phenolic resin foams is accordance with the invention makes it possible, on the other hand, to prepare foams which have a defined retentivity for liquids. By varying the amount of alkyl sulfate salt added, this retentivity can be varied, an increase in the amount of this salt under otherwise the same conditions resulting in an enlargement of the cells and a higher percentage of perforated or missing cell walls. The greater the percentage of perforated or missing cell wall is, the lower becomes the retentivity of the foams for liquids. Without the addition of alkyl sulfate salts in accordance with the invention the cell walls are closed on account of the presence of the ethoxylated castor oil. By varying the amount of alkyl sulfate salts added, a retentivity can be set at any desired value in the range from 20 to about 80%.

The desired retentivity values of the foam depend, however, not only on the content of alkyl sulfate salts, but also on their ratio to the ethoxylated castor oil by weight. At the same time the amount of the ethoxylated castor oil is basically to be greater than the amount of the alkyl sulfate salt. In general, the weight ratio of ethoxylated castor oil to the alkyl sulfate salt is between 1:0.2 and 1:0.8; 1:0.3 and 1:0.6 are preferred.

Also the viscosity of the phenolic resol resin that is used has an influence on the retentivity of the foam prepared therefrom. The viscosity is therefore to be between 1,000 and 20,000 cP (=1 to 20 Pa.s). When low-viscosity resins are used, foams are generally obtained having a greater average cell diameter and a lower retentivity, while resins of higher viscosity yield foams having a lower average cell diameter and a higher retentivity if the rest of the conditions of preparation remain constant.

The phenolic resol resin to be used as starting material for the preparation of the phenolic resin foams of the invention is produced in accordance with the method of German Patent No. 1,236,183 (U.S. Pat. No. 3,779,959). Low-boiling organic compounds are preferred as blowing agents which have a preferred boiling range between 20° and 60° C., examples being n-pentane, petroleum ether or monochlorotrifluoromethane.

For the hardening of the foam, acids in either liquid or powder form, preferably organic acids, or mineral acids mixed with these acids, are used. Appropriate as water-soluble acids are not only mineral acids (HCl, $H_2SO_4$, $H_3PO_4$), but also water-soluble sulfonic acids in which the sulfonic acid group is directly connected to an aromatic, preferably mononuclear ring, which can be substituted if desired by $C_{1-4}$ alkyls or by hydroxyl groups. Examples are benzene sulfonic acid, p-toluenesulfonic acid, cresolsulfonic acids, phenosulfonic acid. If aqueous solutions of the above-named acids or their mixtures are used as hardeners, the concentration of the acids in the hardener solutions is usually between 15 and 75%. p-phenol-sulfonic acid or a mixture of p-phenol-sulfonic acid and hydrochloric acid is used as the preferred hardener.

Dyes and fillers (including catalytically active substances for example) can be added to the open-pored foams of the invention for the purpose of coloring them or of achieving special effects. Different colorants (pigments) and/or liquid and solid fillers, such as for example, mono- or polyvalent-glucoses alcohols, sugar, boron compounds, etc., can influence the structure of the foams as regards their pore structure and hence their permeabilty for gas or the ability to absorb liquids rapidly. Such changes can normally be eliminated by an increase or reduction of the amount of surface active substances added in accordance with the invention.

The open-pored foams of the invention have densities between 7 and 150 kg/m³ and are suitable for use:

(a) as filter material for the removal of particulate substances from gaseous and/or liquid media, (b) as adsorber material (also for selective adsorption) for liquid and/or gaseous substances (e.g., water, oils, organic solvents, and liquid heating or motor fuels), (c) As support materials for catalyts for reactions in the gas and liquid phase, (d) as material for mounting and preserving the freshness of plants and cut flowers, (e) in the form of boards, molded pieces, or in granulated form as a substrate material for the soil-less cultivation of plants, (f) for improving the moisture and air economy of soils.

Foams of little or no retentivity for water or organic liquids are preferentially suitable for use as filter material, for the filling of motor fuel tanks and as a catalyst support.

When the foams are applied along (d) and (e), the preferred density is lower than 50 kg/m³.

EXAMPLES

A. Preparation and Foaming of the Phenolic Resol Resin

The phenolic resol resin used in the examples described below was prepared as follows:

143 weight-parts of phenol are condensed with 228 weight-parts of a 30% aqueous formaldehyde solution with the addition of 0.0714 weight-parts of sodium hydroxide in aqueous solution at 100° C. for 70 minutes. The reaction mixture obtained was then dewatered in vacuo to the solid-resin content stated in the individual examples. In the carrying out of the examples, n-pentane was used as the blowing agent, and a 65% aqueous p-phenolsulfonic acid solution was used as the hardener.

For the preparation of the phenolic resin foams of the invention with a capacity for high and rapid liquid absorption and varying retentivity, the mixes described in the following examples were prepared by intimately mixing the individual components with one another and then putting the foamable mixtures into box molds open at the top having a bottom measuring 40×40 cm and a height of 60 cm, and placing the mold in an oven with a circulating air temperature of 40° to 60° C. The foaming is performed with simultaneous solidifcation of the foam within 30 to 40 minutes. After about 80 minutes, the hardened foam blocks were able to be removed from the molds. After complete cooling they were sawed into boards 8 cm thick (cut transversely to the direction of foaming). Oblong test specimens measuring 8×11×22 cm (volume 1936 cm³) were cut from these boards for further testing.

B. Testing of the Foam Products

To determine their water absorption, rate of water absorption, and retentivity, the foam oblongs were weighed after 16 to 24 hours of standing in air (G 1), and laid on a water surface, and the time (T 1) was measured which it took for the oblongs to sink into the water and for the sinking to have come substantially to a stop. Then the weight (G 2) of the oblongs was again determined and the percentage of water absorption was computed from that on the basis of the following equation:

$$WA = \text{water absorption (vol.-\%)} = \frac{(G2 - G1) \times 100}{1936 \text{ cm}^3 \text{ (block volume)}}$$

The water retentivity was judged by laying foam oblongs filled with water by 15 minutes of soaking (weight G 3) flat on a wire mesh and then determining the weight (G 4) of the water that emerged from the brick in a period of 30 minutes.

The water loss is a measure of the water retentivity. The so-called water retentivity WR (in vol.-%) with respect to the volume of the test body, is then computed according to the following formula:

$$WR \text{ (vol.-\%)} = \frac{G3 - (G1 + G4) \times 100}{1936 \text{ cm}^3 \text{ (brick volume)}}.$$

The proportion of closed cells in the foams prepared in the examples was determined with a Beckman Air Comparison Pyknometer. The cell diameter of the foams can be determined by scanning electron microscope photography. The structure of the foams was additionally judged by visual appearance, the following abbreviations being used in the tables:

fp=fine-pored, having cells whose diameters range mostly from 0.1 to 0.4 mm, mp=medium-pored, having cells whose diameters range mostly from 0.2 to 1.0 mm, lp=large-pored, having cells whose diameters range mostly from 0.4 to 2.0 mm.

EXAMPLES 1 AND 2

For each example, 5 kg of a resin was used as starting material which had been made as described under A, and from which water had been removed by distillation until the viscosity amounted to 2350 mPa.s. For purposes of comparison, only 150 g of ethoxylated castor oil (3 wt.-%) was added to one sample of the resin, while 60 g (1.2%) of sodium lauryl sulfate was additionally added to a second sample. The foaming and further working were performed after the addition of 600 cm³ of n-pentane, 200 cm³ of p-toluenesulfonic acid solution (65% solution) and 10 g of green dye, in the manner described under A. The properties of the foam are given in Table 1.

TABLE 1

|  | Examples | |
| --- | --- | --- |
|  | 1 (comparison) | 2 |
| Density (kg/m³) | 24.2 | 22.7 |
| Cell structure | fp | gp |
| Percentage of closed cells | >80% | >10% |
| Sinking time (T 1) | >500 h | 11 sec |
| Water absorption WA (vol.-%) | — | 92.3 |
| Water retention WR (vol.-%) | — | 28.5 |

EXAMPLES 3 TO 6

For each of the following examples 5 kg of a phenolic resol resin was used which had been made in the same manner as described under A, except that the distillation of the water was continued until the resin had a viscosity of 7160 cP. Before foaming, the amounts of ethoxylated castor oil and sodium lauryl sulfate were added to the resin. The foaming and the preparation of the samples were performed in the same manner as described under A. The results are summarized in Table 2.

TABLE 2

|  | Examples | | | |
| --- | --- | --- | --- | --- |
|  | 3 | 4 | 5 | 6 |
| Amount of ethoxylated castor oil added (g) | 150 | 150 | 150 | 110 |
| Sodium lauryl sulfate added (g) | — | 60 | 70 | 60 |
| Foam properties |  |  |  |  |
| (a) Density (kg/m³) | 21.6 | 20.0 | 21.5 | 22.3 |
| (b) Cell structure | fp | mp | mp | m-lp |
| (c) Percentage of closed cells | >85 | <10 | <10 | <10 |
| (d) Sinking time (T 1) | >500 h | 83 sec | 21 sec | 36 sec |
| (e) Water absorption WA (vol.-%) | — | 81.7 | 86.5 | 84.2 |
| (f) Water retention WR (vol.-%) | — | 60.9 | 40.6 | 52.5 |

TABLE 2-continued

|  | Examples | | | |
| --- | --- | --- | --- | --- |
|  | 3 | 4 | 5 | 6 |
| WR (vol.-%) |  |  |  |  |

EXAMPLES 7 TO 9

In the manner described in Examples 3 to 6, a phenolic resin foam was prepared from 5 kg of the phenolic resol resin which had a viscosity of 12,490 cP. Before foaming, the amounts of surface-active substances given in Table 3 were added to the resin. The rest of the preparation procedure was as described under A. The results of the tests are given in Table 3.

TABLE 3

|  | Examples | | |
| --- | --- | --- | --- |
|  | 6 | 7 | 8 |
| Amount of ethoxylated castor oil added (g) | 150 | 150 | 170 |
| Sodium lauryl sulfate added (g) | — | 60 | 60 |
| Foam properties |  |  |  |
| (a) Density (kg/m³) | 17.0 | 15.1 | 15.4 |
| (c) Percentage of closed cells | >80 | <10 | <10 |
| (d) Sinking time (T 1) | >500 h | 35 sec | 43 sec |
| (e) Water absorption WA (Vol.-%) | — | 87.8 | 89.4 |
| (f) Water retention WR (vol.-%) | — | 72.5 | 83.0 |

The examples show that, even when phenolic resol resins of different viscosity are used, the use of ethoxylated castor oil as the sole pore regulator yields only closed cells, fine-pored foams which have no appreciable water absorption. Only when an alkali salt of an alkyl sulfate is added one does obtain under otherwise comparable experimental conditions largely open-pored foams having a high and rapid water absorption plus various retentivities.

It is therefore possible in accordance with the invention to produce phenolic resin foams having a percentage of open pores that can be between about 20 and 85%. The procedure of the invention therefore makes it possible to prepare phenolic resin foams which can be used for a great variety of applications, as set forth above, the cell size of the foams being predominantly in the range between 0.1 and 2.0 mm.

It will be understood that the specification and examples are illustrative but not limitative of the present invention and that other embodiments within the spirit and scope of the invention will suggest themselves to those skilled in the art.

What is claimed is:

1. Improvement in the preparation of open-pored phenolic resin foams by the foaming of intimate mixtures of water containing phenolic resol resins in the viscosity range of from 1000 to 20,000 cP, low-boiling organic liquids in which the phenolic resol resins are not soluble as blowing agents and acid-containing hardeners, the improvement comprising adding to the foamable phenolic resol resin before or during the preparation of this foamable mixture 1.0 to 6.0 weight-percent of ethoxylated castor oil and 0.5 and 5 weight-percent of an alkyl sulfate salt of the general formula

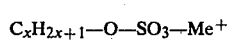

$$C_xH_{2x+1}-O-SO_3-Me^+$$

wherein x an integer from 8 to 18 and Me is an alkali metal or a triethanolamine cation.

2. Improvement as claimed in claim 1, wherein said acid-containing hardener is a sulfonic acid containing hardener.

3. Improvement as claimed in claim 1, wherein x in the formula is 12 to 14.

4. Improvement as claimed in claim 1, wherein Me is an alkali metal.

5. Improvement as claimed in claim 1, wherein Me is a triethanolamine cation.

6. Improvement as claimed in claim 1, wherein said ethoxylated castor oil and alkyl sulfate salt are added to the foamable phenolic resol resin before the preparation of the foamable mixture.

7. Improvement as claimed in claim 1, wherein said castor oil and alkyl sulfate salt is added to the foamable phenolic resol resin during preparing and mixing the foamable mixture.

8. Improvement as claimed in claim 1, wherein after said foaming, more than 50% of the foam-cells obtained have a cell diameter from 0.1 to 2.0 mm.

* * * * *

UNITED STATES PATENT AND TRADEMARK OFFICE
CERTIFICATE OF CORRECTION

PATENT NO. : 4,426,462
DATED : January 17, 1984
INVENTOR(S) : Weissenfels, et al.

It is certified that error appears in the above-identified patent and that said Letters Patent is hereby corrected as shown below:

Column 2, line 27, "phneolic" should read -- phenolic --.

Column 2, line 35, "$Me^{30}$" should read -- $Me^{+}$ --.

Column 2, line 53, "is" should read -- in --.

Signed and Sealed this

First Day of January 1985

[SEAL]

Attest:

GERALD J. MOSSINGHOFF

Attesting Officer

Commissioner of Patents and Trademarks